(12) United States Patent
Horita et al.

(10) Patent No.: US 7,148,904 B2
(45) Date of Patent: Dec. 12, 2006

(54) METHOD AND APPARATUS FOR MERGING MESHES, AND COMPUTER READABLE MEDIUM

(75) Inventors: Shinichi Horita, Osaka (JP); Koichi Fujiwara, Otsu (JP); Eiro Fujii, Takatsuki (JP); Koji Fujiwara, Osaka (JP); Osamu Toyama, Kakogawa (JP)

(73) Assignee: Konica Minolta Holdings, Inc., Tokyo (JP)

( * ) Notice: Subject to any disclaimer, the term of this patent is extended or adjusted under 35 U.S.C. 154(b) by 214 days.

(21) Appl. No.: 10/716,496

(22) Filed: Nov. 20, 2003

(65) Prior Publication Data

US 2005/0017987 A1    Jan. 27, 2005

(30) Foreign Application Priority Data

Jul. 25, 2003    (JP) .............................. 2003-201713

(51) Int. Cl.
*G09G 5/00*    (2006.01)
(52) U.S. Cl. ...................... 345/629; 345/419; 345/421; 345/630; 345/648
(58) Field of Classification Search ................ 345/419, 345/629, 423, 421, 630, 648
See application file for complete search history.

(56) References Cited

U.S. PATENT DOCUMENTS 5,894,308 A * 4/1999 Isaacs ........................ 345/420

FOREIGN PATENT DOCUMENTS

JP    8-293042    11/1996

OTHER PUBLICATIONS

Isenburg et al. "Out-of-Core Compression for Gigantic Polygon Meshes", ACM 2003, pp. 935-942.*
Turk, G. et al. "Zippered Polygon Meshes from Range Images." Computer Science Department Stanford University, pp. 8.
Turk, G. et al., "Zippered Polygon Meshes from Range Images." Computer Science Department Stanford University, pp. 8.

* cited by examiner

*Primary Examiner*—Kimbinh T. Nguyen
(74) *Attorney, Agent, or Firm*—McDermott Will & Emery LLP (57) ABSTRACT

A method and an apparatus are provided for merging two meshes whose density differs from each other so as to avoid unnatural appearance. A first mesh and a second mesh that differ from each other in density are merged by the following procedure. Edge length of a portion that becomes a boundary between the first and second meshes is determined, size of a first group of polygons including the edge of the portion is determined based on the determined length and size of a second group of polygons is adjusted so that an adjustment ratio is smaller as a distance between a position of each of the second group of polygons and the portion is greater, the first and second group of polygons being part of polygons structuring the first and second meshes, and the first and second meshes in each of which the polygons are adjusted are merged.

16 Claims, 7 Drawing Sheets

PRIOR ART

METHOD AND APPARATUS FOR MERGING MESHES, AND COMPUTER READABLE MEDIUM

This application is based on Japanese Patent Application No. 2003-201713 filed on Jul. 25, 2003, the contents of which are hereby incorporated by reference.

BACKGROUND OF THE INVENTION

1. Field of the Invention

The present invention relates to a method for merging plural meshes whose density differs from each other.

2. Description of the Related Art

Figure 7A:
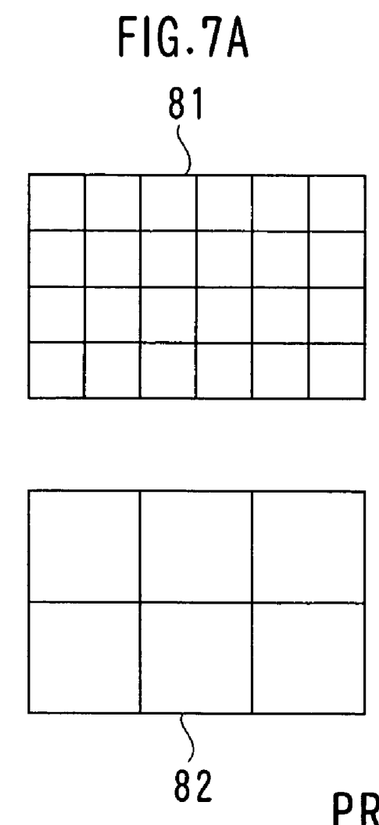
FIGS. 7A and 7B show an example of a polygon image obtained by the conventional method for merging meshes.
Figure 7B:
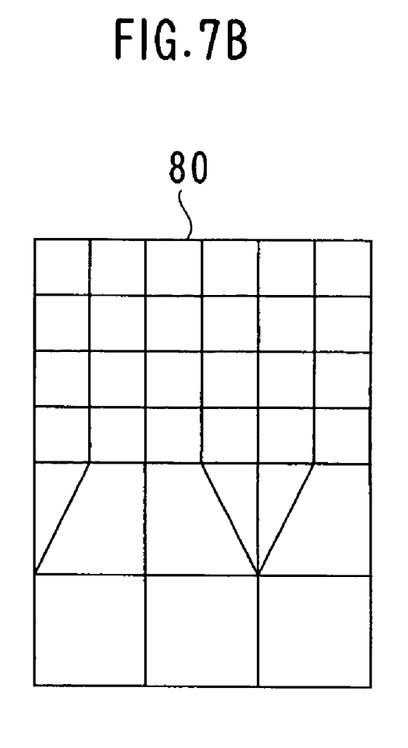

FIGS. 7A and 7B show an example of a polygon image 80 obtained by the conventional method for merging meshes.

Conventionally, there are proposed methods for generating the entire three-dimensional shape data of a certain object based on a plurality of fragmentary three-dimensional shape data of the object.

According to a method disclosed in Related Publication 1 (Japanese unexamined patent publication No. 8-293042), for example, three-dimensional shape data of an object are input from various directions to bring three-dimensional shape data into alignment with other three-dimensional shape data. A cutting plane is set for each boundary between neighboring three-dimensional shape data to determine range shape data divided by the cutting plane. Then, for each of the cutting planes, data of areas sandwiching the cutting plane of range shape data are represented by two-dimensional coordinates, Delaunay triangulation is used to generate triangle patch data on the areas, and plural three-dimensional shape data are integrated (merged) with each other.

According to a method disclosed in Related Publication 2 ("Zippered Polygon Meshes from Range Images", Greg Turk and Marc Levoy, Computer Science Department Stanford University), polygons overlapping at a boundary between neighboring meshes (polygon meshes) are removed from the meshes. Then, polygons intersecting at the boundary are detected to create intersections, so that polygons are reconstructed.

As shown in FIG. 7A, there are cases where neighboring two meshes 81 and 82 to be merged have polygon density (resolution in displaying) differing from each other.

In the conventional methods, merging is performed without regard to differences in resolution. Accordingly, when the conventional methods are adopted to merge the mesh 81 with the mesh 82 whose resolution substantially differs from that of the mesh 81, large changes occur in resolution at a seam (a boundary) between the meshes, as a polygon image 80 shown in FIG. 7B. Further, a polygon having an undesirable shape may be generated, such as a polygon that is excessively large in edge length, or a polygon that is extremely small in minimum interior angle. In such a case, a polygon image obtained by merging meshes appears unnatural.

SUMMARY OF THE INVENTION

The present invention is directed to solve the problems pointed out above, and therefore, an object of the present invention is to merge two meshes having density different from each other in such a manner as to avoid unnatural appearance.

According to one aspect of the present invention, a method for merging a first mesh and a second mesh that differ from each other in density includes a first step of determining length of an edge of a portion that becomes a boundary between the first mesh and the second mesh, a second step of adjusting size of a first group of polygons including the edge of the portion that becomes the boundary based on the length determined in the first step, and of adjusting size of a second group of polygons other than the first group of polygons so that an adjustment ratio is smaller as a distance between a position of each of the second group of polygons and the portion that becomes the boundary is greater, each of the first and second groups of polygons being part of polygons structuring the first mesh and of polygons structuring the second mesh and a third step of merging the first mesh and the second mesh in each of which the polygons are adjusted.

Preferably, in the second step, of the polygons structuring each of the first mesh and the second mesh, the size of the first group of polygons is adjusted first and the size of the second group of polygons other than the first group of polygons is adjusted by determining adjustment order of length of an edge so that edges to be adjusted first are edges contacting any of the first group of polygons out of edges structuring each of the second group of polygons and that edges to be adjusted next and later are edges contacting any of the edges processed in the immediately preceding adjustment in turn, and by adjusting length of plural edges corresponding to the same order based on an intermediate value between an average value of the plural edges and an average value before adjustment of plural edges corresponding to any order prior to the same order.

Preferably, in the first step, the length of the edge of the portion that becomes the boundary is determined by obtaining an average value of the length of the edge of the portion that becomes the boundary in each of the first and second meshes before adjustment and by selecting a mean value of the average values or either one of the average values.

According to another aspect of the present invention, a method for merging a first mesh and a second mesh that differ from each other in density includes a first step of determining an average value of length of an edge of each of the first mesh and the second mesh, the edge corresponding to a portion that becomes a boundary therebetween, a second step of selecting an intermediate value of the average values determined in the first step, a third step of adjusting polygons structuring each of the first mesh and the second mesh so that the length of the edge of the portion that becomes the boundary in each of the first mesh and the second mesh takes the intermediate value selected in the second step and a fourth step of merging the first mesh and the second mesh in each of which the polygons are adjusted in the third step.

These and other characteristics and objects of the present invention will become more apparent by the following descriptions of preferred embodiments with reference to drawings.

DESCRIPTION OF THE PREFERRED EMBODIMENTS

Figure 1:
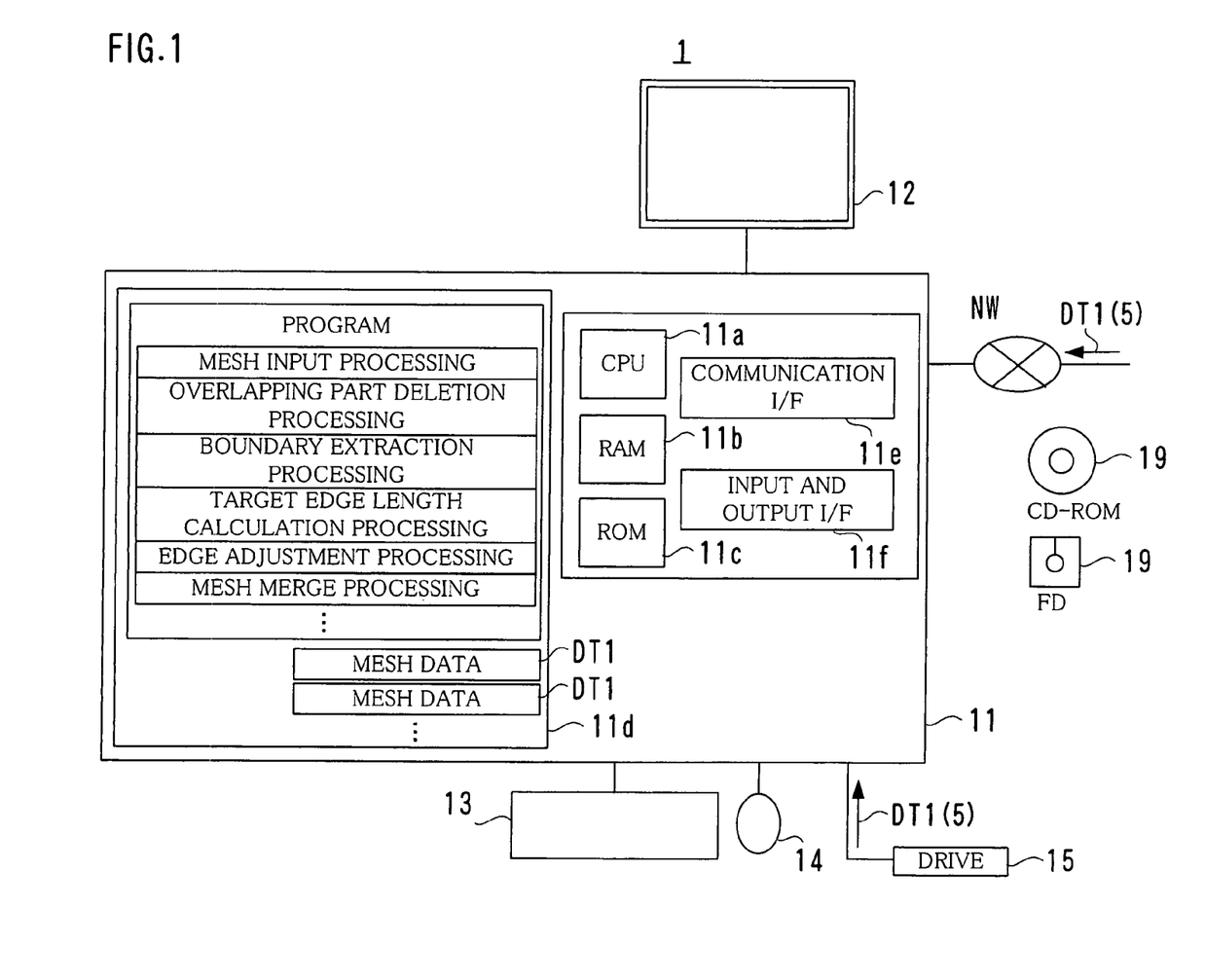
FIG. 1 is a diagram showing an example of a hardware structure of a three-dimensional processor.
Figure 2:
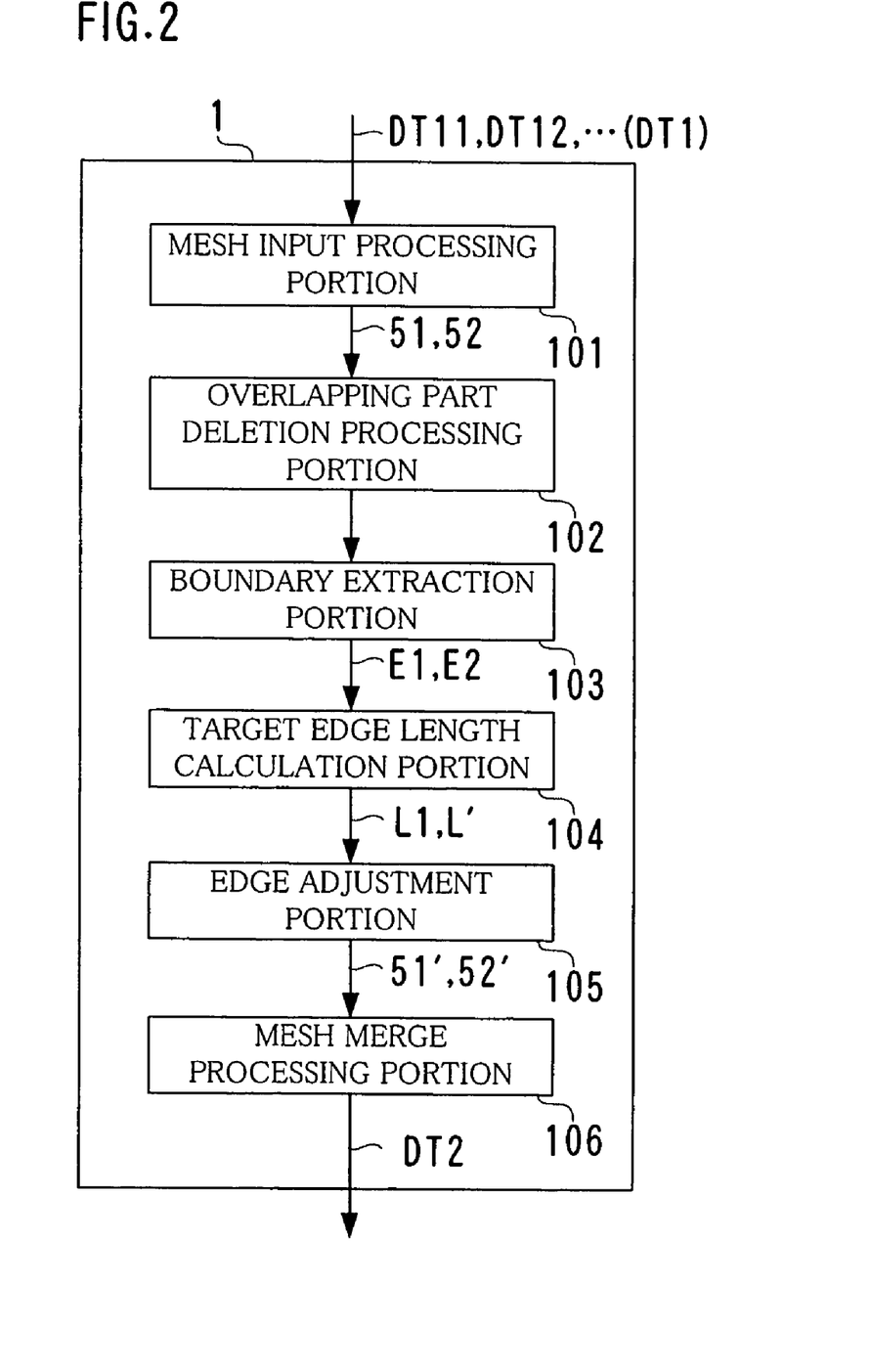
FIG. 2 is a diagram showing an example of a functional structure of the three-dimensional processor.
Figure 3A:
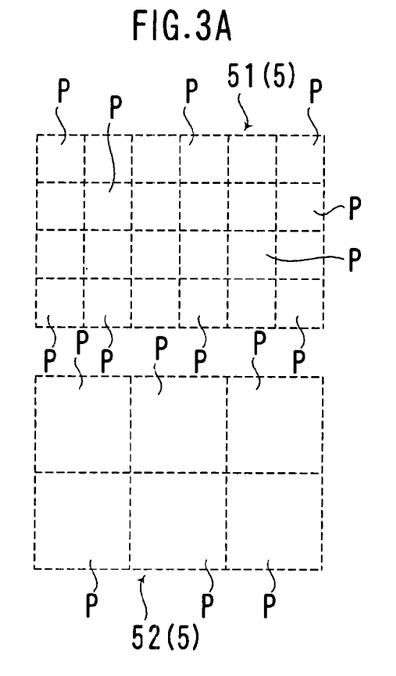
FIGS. 3A–3C are explanatory diagrams of deletion of overlapping portions of meshes.
Figure 3B:
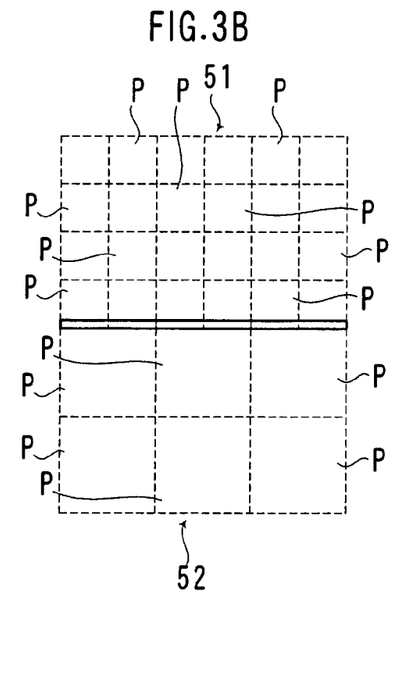
Figure 3C:
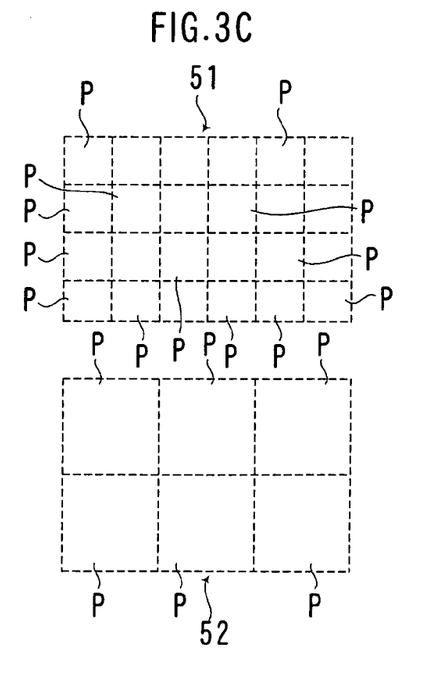
Figure 4A:
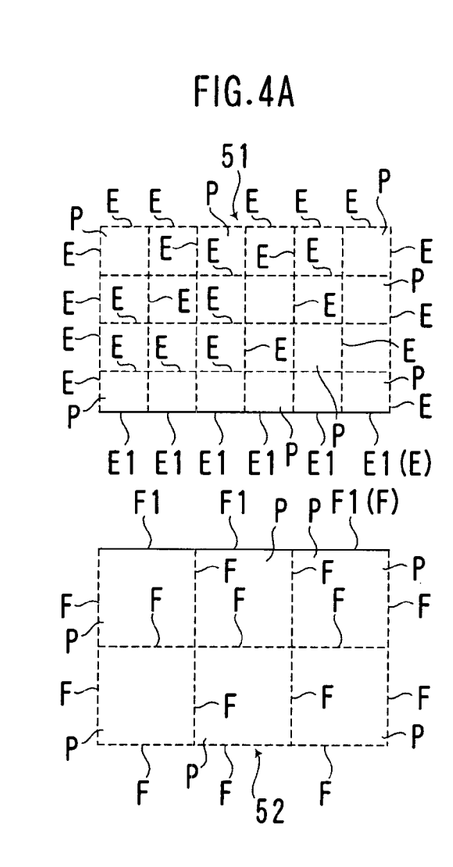
FIGS 4A–4C show an example of edge adjustment in meshes.
Figure 4B:
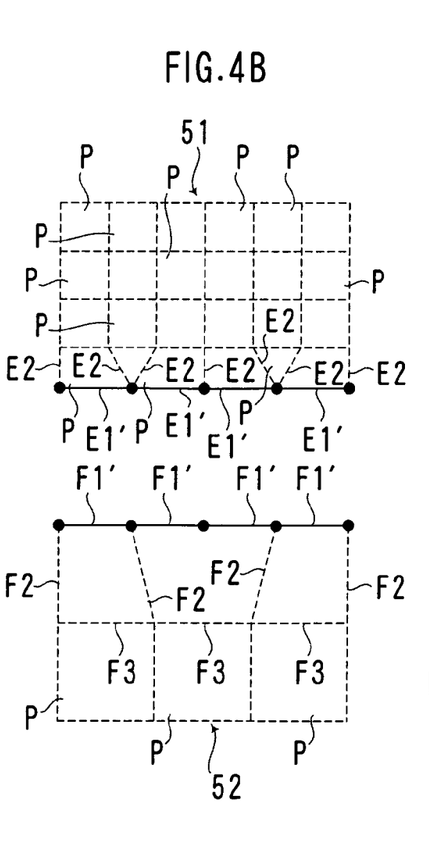
Figure 4C:
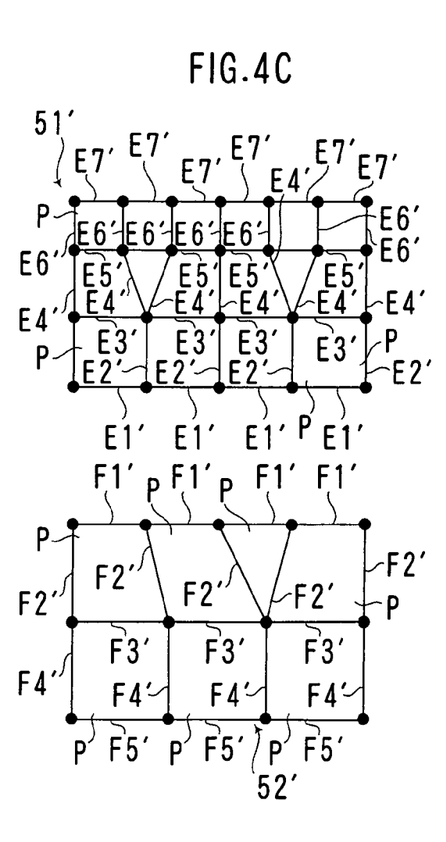
Figure 5:
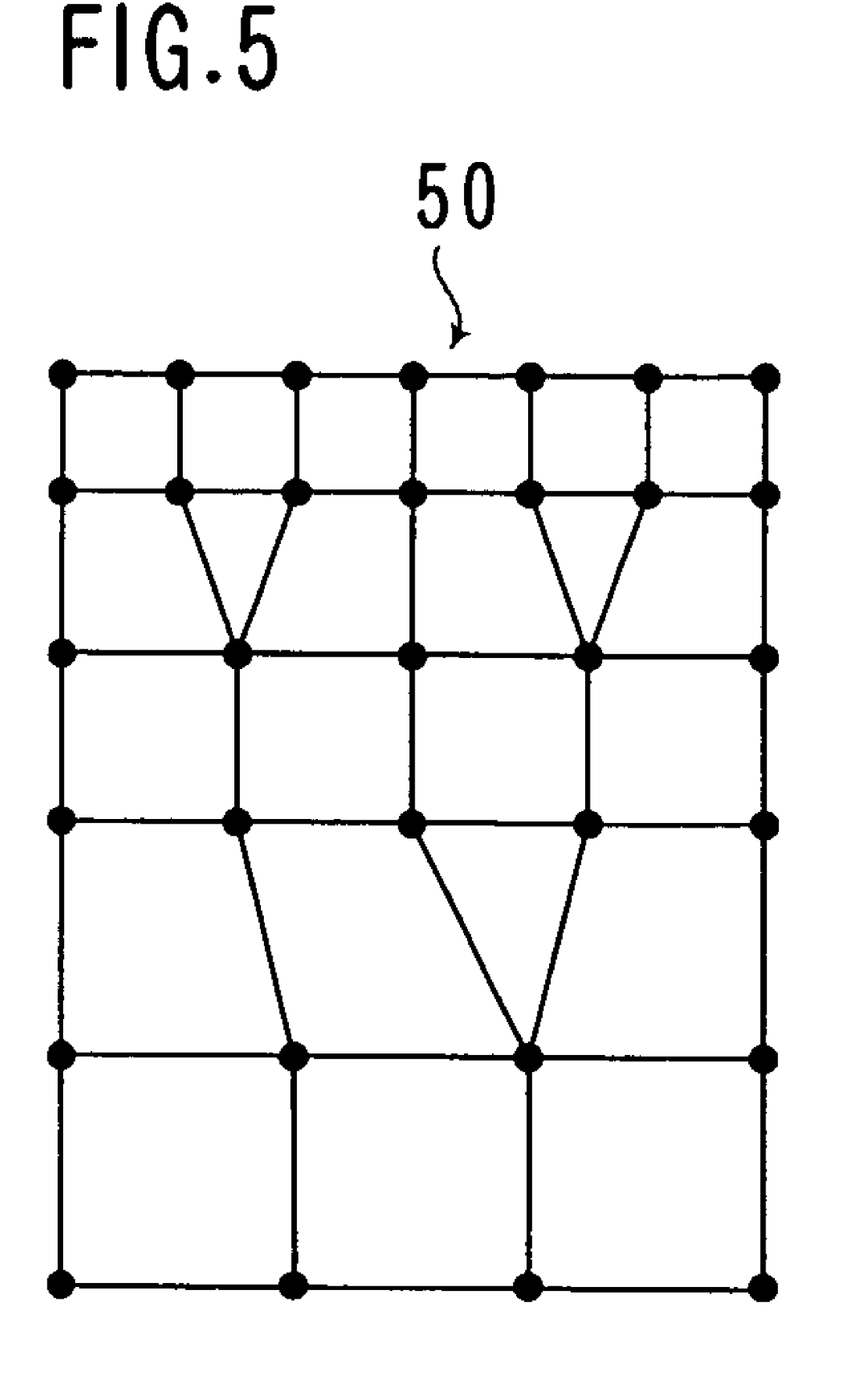
FIG. 5 is a diagram showing an example of a polygon image obtained by a merging process.

FIG. 1 is a diagram showing an example of a hardware structure of a three-dimensional processor 1. FIG. 2 is a diagram showing an example of a functional structure of the three-dimensional processor 1. FIGS. 3A–3C are explanatory diagrams of deletion of overlapping portions of meshes 51 and 52. FIGS. 4A–4C show an example of adjustment of edges E and F in the meshes 51 and 52. FIG. 5 is a diagram showing an example of a polygon image 50 obtained by a merging process.

As shown in FIG. 1, the three-dimensional processor 1 according to the present invention includes a three-dimensional processor body 11, a display 12, input devices such as a keyboard 13 and a mouse 14, and a drive 15 for reading and writing data to a removable disk such as a flexible disk or a CD-ROM.

The three-dimensional processor body 11 includes a CPU 11*a*, a RAM 11*b*, a ROM 11*c*, a magnetic storage device (a hard disk drive) 11*d*, a communication interface 11*e* and a variety of input and output interfaces 11*f*.

On the magnetic storage device 11*d* are memorized programs and data for realizing functions of various portions including a mesh input processing portion 101, an overlapping part deletion processing portion 102, a boundary extraction portion 103, a target edge length calculation portion 104, an edge adjustment portion 105 and a mesh merge processing portion 106, all of which are shown in FIG. 2.

These programs and data are installed from a removable disk 19 such as a flexible disk or a CD-ROM on the magnetic storage device 11*d*. Alternatively, those programs and data are downloaded from other computers via a network NW. There are some cases where mesh data DT1 of meshes (polygon meshes) 5 are input to the three-dimensional processor body 11 from a three-dimensional measurement device connected via the input and output interfaces 11*f*. These programs and data are loaded on the RAM 11*b* as required and the programs are executed by the CPU 11*a*.

The execution of the programs enables neighboring meshes to be merged (integrated) with each other. Execution results of the programs, i.e., merging process results of meshes are displayed on the display 12. A personal computer or a workstation is used as the three-dimensional processor 1.

The Function of each of the portions shown in FIG. 2 is described below.

The mesh input processing portion 101 performs a process for inputting the plural meshes 5 (51, 52, . . . ) to be merged as mesh data DT1 (DT11, DT12, . . . ), the meshes 5 being shown in FIG. 3A.

The meshes 5 obtained in this way are arranged at predetermined positions in a three-dimensional space to be merged (integrated) with each other, so that data indicating the entire three-dimensional shape of one object are obtained. In some cases, however, the meshes 5 have resolution differing from each other upon displaying the same. Stated differently, each of the meshes 5 may have individual density (the number of polygons P per unit area). Accordingly, this point is taken into account and, for example, the neighboring meshes 51 and 52 having resolution differing from each other, which are shown in FIG. 3A, are merged as follows.

The overlapping part deletion processing portion 102 serves to arrange the meshes 51 and 52 at predetermined positions in a three-dimensional space. As shown by a solid line in FIG. 3B, if there are redundant portions in the meshes 51 and 52, or portions protruding from the entire object such as a margin for a seam on a wrong side of a shirt (hereinafter both the portions are referred to as "overlapping portions"), the overlapping part deletion processing portion 102 removes the portions. The meshes 51 and 52 after the removal are shown in FIG. 3C.

Of fifty-eight edges E and seventeen edges F structuring the meshes 51 and 52, respectively, the boundary extraction portion 103 extracts each portion that is supposed to come into contact with the opposed mesh, i.e., edges E and F to be boundaries of the meshes 51 and 52. Thus, six edges E and three edges F drawn with solid lines in FIG. 4A are extracted. Hereinafter, the edges E and F corresponding to the boundary portions may be referred to as "boundary edges E1" and "boundary edges F1" respectively in order to distinguish from other edges E and F.

The target edge length calculation portion 104 calculates the length to be adjusted of each of the edges E and F in the case of merging the meshes 51 and 52. In other words, the target edge length calculation portion 104 calculates edge length that becomes a target of adjustment (hereinafter referred to as "target edge length").

Target edge length L1 is shared as target edge length for adjusting the boundary edges E1 and the boundary edges F1. The target edge length L1 is calculated by the following way: First, average edge length Lev that is the average length of the six boundary edges E1. As the average edge length Lev, an arithmetic mean value or a geometric mean value may be used, or the length of the third or fourth longest boundary edge E1 may be used. In a similar fashion, average edge length Lfv of the three boundary edges F1 is calculated.

Then, an intermediate value of the average edge length Lev and Lfv is selected as the target edge length L1. For example, the mean of the average edge length Lev and Lfv is made the target edge length L1. Alternatively, either the average edge length Lev or Lfv may be made the target edge length L1.

An explanation will hereinafter be given of calculation of target edge length for adjusting edges E and F other than the boundary edges E1 and F1.

The edge adjustment portion 105 adjusts each of the edges E and F structuring the meshes 51 and 52 respectively based on the target edge length calculated by the target edge length calculation portion 104. More particularly, adjustment is so made that each of the edges E and F has length included in a fixed range (a tolerance) shown in the following inequality (1).

$$(1-\epsilon)L \leq e (\text{or } f) \leq (1+\epsilon)L \quad (1)$$

Here, e and f indicate edge length of edges E and F to be adjusted, respectively. $\epsilon$ represents a constant for determining the tolerance and L indicates the target edge length.

When the boundary edges E1 are targets of adjustment, for example, the edge length of each of the boundary edges E1 is adjusted so as to satisfy the following inequality (1'). Each of the boundary edges F1 is also adjusted so as to have the same edge length as each of the boundary edges E1.

$$(1-\epsilon)L1 \leq e \leq (1+\epsilon)L1 \quad (1')$$

In some cases, the adjustment of the edge length causes shortage or redundancy of the number of edges. On this occasion, adjustment between edges that are targets of adjustment is performed by dividing, degenerating, coupling, elongating the edges or other operations.

Thereby, the edge length of each of the boundary edges E1 and F1 subjected to the adjustment turns out to be edge length of boundary edges E1' and F1' shown in FIG. 4B. The boundary edges E1' and F1' opposed to each other are equal in length (edge length). Referring to FIGS. 4B–4C, solid lines show edges after adjustment and dots represent endpoints of edges after adjustment.

Additionally, adjustment is made to edges E and F other than the boundary edges E1 and F1 in the following manner.

The target edge length calculation portion 104 picks up edges E and F connected to the endpoints of the edges E and F that are already processed in the immediately preceding edge adjustment, and calculates target edge length for each of the selected edges E and F. For instance, when the immediately preceding process targets are the boundary edges E1 and F1, edges E2 and F2 in FIG. 4B are made process targets, so that the target edge length calculation portion 104 calculates target edge length for adjusting the edges E2 and F2.

Target edge length (L') of each of edges E and F other than the boundary edges E1 and F1 is calculated by the following equality (2).

$$L' = tLb + (1-t)La \quad (2)$$

Here, Lb represents the target edge length in the previous edge adjustment process, La shows the mean of length of edges that are current process targets, and t indicates evaluation weight ($0 \leq t \leq 1$).

Since the mesh 51 and the mesh 52 differ from each other in resolution (density of the polygons P or the average size thereof), at least the value of La differs for each of the edges E and F to be processed. Accordingly, the edges E and the edges F differ from each other in the value of the target edge length L'.

The initial value of the evaluation weight t in the equality (2) is "1". Every time when the adjustment processing is performed (as a distance between each of targets to be processed and the boundary of the meshes 51 and 52 is greater), the value of the evaluation weight t is gradually reduced. The value of the evaluation weight t is reduced by "0.1", such as "1" for the processing of the boundary edges E1 and F1, "0.9" for the processing of the edges E2 and F2, and the like.

In this way, the target edge length of the edges E in the mesh 51 is gradually reduced as a distance between the position of each of the edges E and the boundary is greater, ensuring that the shape and size of the polygons P gradually come closer to those of the polygons P before adjustment. Correspondingly, the target edge length of the mesh 52 is increased little by little, so that the shape and size of the polygons P gradually come closer to those of the polygons P before adjustment. In short, it can be mentioned that the evaluation weight t represents an adjustment ratio of the edges and the polygons structuring the meshes.

Similar to the case of the boundary edges E1 and F1 described above, the edge adjustment portion 105 adjusts each of the edges E and F that are to be processed, based on the calculated target edge length L' and the inequality (1). More specifically, adjustment is so made that each of the edges E and F has length included in a fixed range (a tolerance) shown in the inequality (1). Further, adjustment between edges is performed by dividing, degenerating, coupling, elongating the edges or other operations.

The processing by the target edge length calculation portion 104 and the edge adjustment portion 105 is conducted sequentially toward the direction away from the boundary of the mesh 51. Thereby, as shown in FIG. 4C, the edges E in the mesh 51 turn out to be E1', E2', ..., so that a mesh 51' is obtained. Likewise, the edges F in the mesh 52 turn out to be F1', F2', ..., so that a mesh 52' is obtained.

As illustrated in FIG. 4C, each of the polygons P forming the meshes 51' and 52' is adjusted so as to come closer to the original polygons P as a distance between the position of each of the polygons P and the boundary is greater.

However, the edge adjustment processing terminates at the point when the edge length of the edges subjected to the processing is regarded as being approximately the same as the edge length of the original edges (the edges before adjustment) corresponding to the processed edges. Discrimination as to whether or not the processing is terminated may be performed, for example, as follows.

The mean of the edge length in edges that are next targets of the adjustment processing (hereinafter may be referred to as "average edge length") is calculated. Comparison is made between the calculated average edge length and the target edge length of the edges subjected to the previous adjustment processing. When the difference therebetween is smaller than a predetermined value, it is discriminated that the processing is terminated. Alternatively, when the ratio therebetween is within a predetermined range close to "1" (0.95–1.05, for example), it is discriminated that the processing is finished. For instance, when adjustment is intended to be made to edges F3 next, the average edge length of the edges F3 is compared to the target edge length L of the edges F2 that are the latest process targets, then performing the discrimination. Alternatively, the average edge length of the edges F3 may be compared to the target edge length L of the edges F1 that are the second latest process targets.

Referring to FIG. 2, the mesh merge processing portion 106 performs a process for merging (integrating) the meshes 51 and 52 adjusted by the edge adjustment portion 105 using the conventional merging method on a polygon-by-polygon basis. Thus, the polygon image 50 in which the meshes are merged with each other is obtained, as shown in FIG. 5. The polygon image 50 is displayed on the display 12 (see FIG. 1). Alternatively, the polygon image 50 is output to an external device or others as polygon image data DT2.

Figure 6:
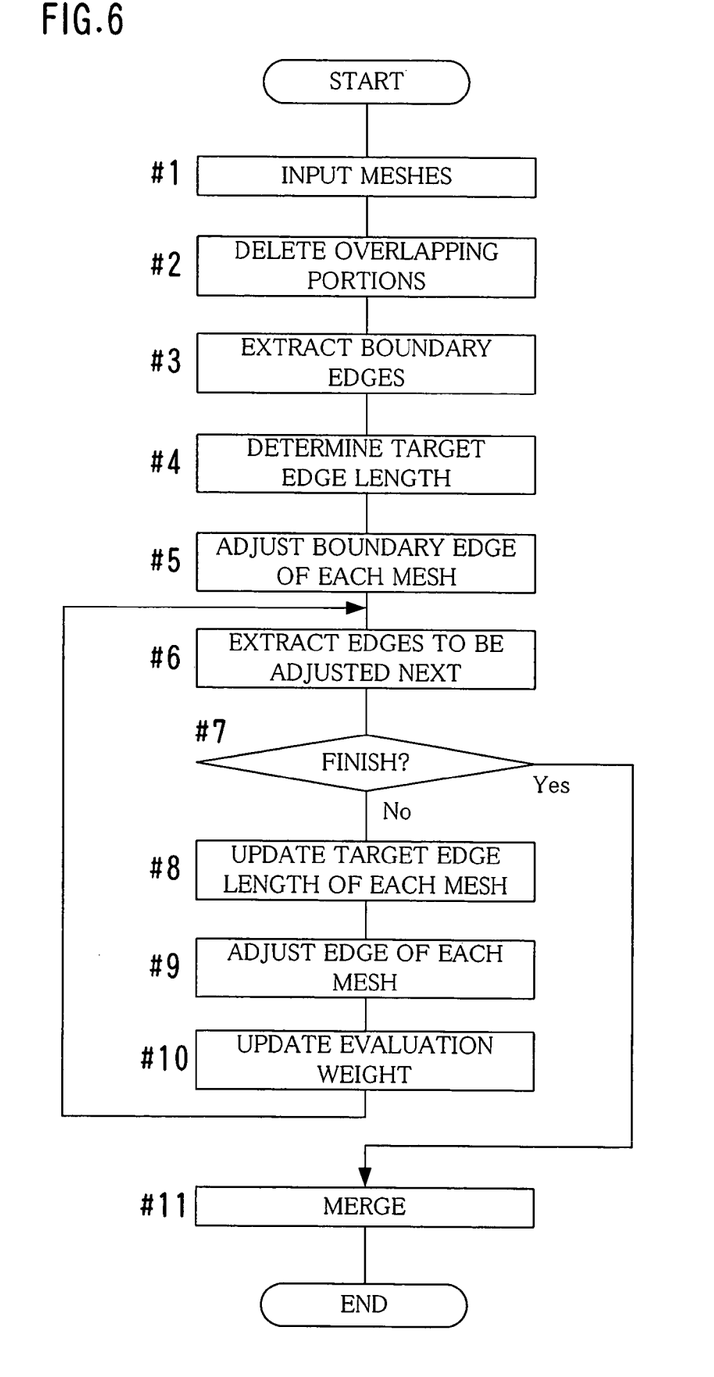
FIG. 6 is a flowchart showing an example of the entire merging process in the three-dimensional processor.

FIG. 6 is a flowchart describing an example of the entire merging process in the three-dimensional processor 1. Next, an explanation will be made about the merging process by adjusting the meshes 51 and 52 with reference to the flowchart shown in FIG. 6.

First, the meshes 51 and 52 to be merged are input to the three-dimensional processor 1 (#1). It is checked whether there are overlapping portions in the case of arranging each of the meshes 51 and 52 in a predetermined three-dimensional space. When overlapping portions are seen, a process including deletion of the same is performed (#2).

The boundary edges E1 and F1 that are portions contacting the meshes 52 and 51 respectively are extracted (#3). The approximate length to be adjusted of each of the boundary edges E1 and F1 is determined. In other words, the target edge length L1 of the boundary edges E1 and F1 is determined (#4). For example, the mean of the average edge length Lev of the boundary edges E1 and the average edge length Lfv of the boundary edges F1 is made the target edge length L1.

Based on the calculated target edge length L1 and the inequality (1), the edge length of the boundary edges E1 and F1, and the positional relationship therebetween are regulated (#5).

Then, edges E and F to be adjusted in the next adjustment process are extracted (#6). For example, if the adjustment of the boundary edges E1 and F1 are finished, the edges E2 and F2 that are connected to endpoints of the boundary edges E1 and F1 respectively are extracted (see FIG. 4B).

The average edge length of the extracted edges E to be processed is determined, and the average edge length is compared to the target edge length of the edges E that are the previous process targets. When the difference therebetween is smaller than a predetermined value or within a predetermined range close to "1", the adjustment of the edges E in the mesh 51 is terminated. Similar comparison is made to the edges F in the mesh 52, and it is discriminated whether or not the adjustment is finished. When it is judged that the adjustment of both the meshes 51 and 52 is finished (Yes in #7), the process goes to #11. When it is not judged that the adjustment of both the meshes 51 and 52 is finished (No in #7), processes in steps #8 and 9, which are described next, are performed for edges in meshes judged to continue adjustment.

The equality (2) is used to calculate the target edge length L' of each of the edges E and F to be processed (#8). Then, based on the each of the calculated target edge length L', the edge length of the edges E and F to be processed, the positional relationship therebetween and others are adjusted (#9).

After the evaluation weight t is reduced only by a predetermined value (#10), edges E and F connected to the endpoints of the edges E and F that has been adjusted are made the next process targets and the processes in steps #6–10 are repeated for the edges E and F as the next process targets.

When it is judged that the adjustment of both the meshes 51 and 52 is finished in step #7, a process for merging the adjusted mesh 51 with the adjusted mesh 52 (#11). Thereby, the polygon image 50 shown in FIG. 5 is obtained.

According to the present embodiment, in merging two meshes whose density (fineness) differs from each other, polygons structuring the meshes are adjusted in such a manner as to be similar to each other in size in the vicinity of the boundary between the meshes, and to have smaller adjustment ratios with being far away from the boundary. Therefore, it is possible to eliminate sudden change in size of meshes, and to merge both meshes so as to appear natural.

In the present embodiment, adjustment of each of the edges in the meshes 51 and 52 is followed by the merging process of both the meshes (#7 and #11 in FIG. 6). However, the merging process may be conducted at a time point when the boundary edges E1 and F1 are adjusted (#5). Additionally, the edge length and the position of each of the processed edges may be fine-tuned if necessary while the processes between steps #6 and #10 are repeated.

Structures, processing contents and processing order of each part or whole part of the three-dimensional processor 1, function for determining each value and contents of inequality for discrimination can be varied as required within the scope of the present invention.

What is claimed is:

1. A method for merging a first mesh and a second mesh that differ from each other in density, the method comprising:

a first step of determining length of an edge of a portion that becomes a boundary between the first mesh and the second mesh;

a second step of adjusting size of a first group of polygons including the edge of the portion that becomes the boundary based on the length determined in the first step, and of adjusting size of a second group of polygons other than the first group of polygons so that an adjustment ratio is smaller as a distance between a position of each of the second group of polygons and the portion that becomes the boundary is greater, each of the first and second groups of polygons being part of polygons structuring the first mesh and of polygons structuring the second mesh; and a third step of merging the first mesh and the second mesh in each of which the polygons are adjusted.

2. The method according to claim 1, wherein in the second step, of the polygons structuring each of the first mesh and the second mesh, the size of the first group of polygons is adjusted first; and the size of the second group of polygons is adjusted by determining adjustment order of length of an edge so that edges to be adjusted first are edges contacting any of the first group of polygons out of edges structuring each of the second group of polygons and that edges to be adjusted next and later are edges contacting any of the edges processed in the immediately preceding adjustment in turn, and by adjusting length of plural edges corresponding to the same order based on an intermediate value between an average value of the plural edges and an average value before adjustment of plural edges corresponding to any order prior to the same order.

3. The method according to claim 2, wherein in the first step, the length of the edge of the portion that becomes the boundary is determined by obtaining an average value of the length of the edge of the portion that becomes the boundary in each of the first and second meshes before adjustment and by selecting an intermediate value of the average values.

4. The method according to claim 3, wherein in the first step, as the intermediate value of the average values of the edge length of the portion that becomes the boundary in each of the first and second meshes before adjustment, a mean value of the average values is selected.

5. The method according to claim 3, wherein in the first step, as the intermediate value of the average values of the edge length of the portion that becomes the boundary in each of the first and second meshes before adjustment, either one of the average values is selected.

6. An apparatus for merging a first mesh and a second mesh that differ from each other in density, the apparatus comprising:

an edge length determination portion for determining length of an edge of a portion that becomes a boundary between the first mesh and the second mesh;

a polygon adjustment portion for adjusting size of a first group of polygons including the edge of the portion that becomes the boundary based on the length determined by the edge length determination portion, and for adjusting size of a second group of polygons other than the first group of polygons so that an adjustment ratio is smaller as a distance between a position of each of the second group of polygons and the portion that becomes the boundary is greater, each of the first and second groups of polygons being part of polygons structuring the first mesh and of polygons structuring the second mesh; and a mesh merge processing portion for merging the first mesh and the second mesh in each of which the polygons are adjusted.

7. The apparatus according to claim 6,
wherein, of the polygons structuring each of the first mesh and the second mesh, the polygon adjustment portion adjusts the size of the first group of polygons first; and
the polygon adjustment portion adjusts the size of the second group of polygons by determining adjustment order of length of an edge so that edges to be adjusted first are edges contacting any of the first group of polygons out of edges structuring each of the second group of polygons and that edges to be adjusted next and later are edges contacting any of the edges processed in the immediately preceding adjustment in turn, and by adjusting length of plural edges corresponding to the same order based on an intermediate value between an average value of the plural edges and an average value before adjustment of plural edges corresponding to any order prior to the same order.

8. The apparatus according to claim 7, wherein the edge length determination portion determines the length of the edge of the portion that becomes the boundary by obtaining an average value of the length of the edge of the portion that becomes the boundary in each of the first and second meshes before adjustment and by selecting an intermediate value of the average values.

9. The apparatus according to claim 8, wherein the edge length determination portion selects a mean value of the average values as the intermediate value of the average values of the edge length of the portion that becomes the boundary in each of the first and second meshes before adjustment.

10. The apparatus according to claim 8, wherein the edge length determination portion selects either one of the average values as the intermediate value of the average values of the edge length of the portion that becomes the boundary in each of the first and second meshes before adjustment.

11. A computer readable medium storing a computer program for merging a first mesh and a second mesh that differ from each other in density, the program making a computer perform the processing of:
a first processing of determining length of an edge of a portion that becomes a boundary between the first mesh and the second mesh;
a second processing of adjusting size of a first group of polygons including the edge of the portion that becomes the boundary based on the length determined in the first processing, and of adjusting size of a second group of polygons other than the first group of polygons so that an adjustment ratio is smaller as a distance between a position of each of the second group of polygons and the portion that becomes the boundary is greater, each of the first and second groups of polygons being part of polygons structuring the first mesh and of polygons structuring the second mesh; and
a third processing of merging the first mesh and the second mesh in each of which the polygons are adjusted.

12. The computer readable medium according to claim 11, wherein in the second processing, of the polygons structuring each of the first mesh and the second mesh, the size of the first group of polygons is adjusted first; and
the size of the second group of polygons is adjusted by determining adjustment order of length of an edge so that edges to be adjusted first are edges contacting any of the first group of polygons out of edges structuring each of the second group of polygons and that edges to be adjusted next and later are edges contacting any of the edges processed in the immediately preceding adjustment in turn, and by adjusting length of plural edges corresponding to the same order based on an intermediate value between an average value of the plural edges and an average value before adjustment of plural edges corresponding to any order prior to the same order.

13. The computer readable medium according to claim 12, wherein in the first processing, the length of the edge of the portion that becomes the boundary is determined by obtaining an average value of the length of the edge of the portion that becomes the boundary in each of the first and second meshes before adjustment and by selecting an intermediate value of the average values.

14. The computer readable medium according to claim 13, wherein in the first processing, as the intermediate value of the average values of the edge length of the portion that becomes the boundary in each of the first and second meshes before adjustment, a mean value of the average values is selected.

15. The computer readable medium according to claim 13, wherein in the first processing, as the intermediate value of the average values of the edge length of the portion that becomes the boundary in each of the first and second meshes before adjustment, either one of the average values is selected.

16. A method for merging a first mesh and a second mesh that differ from each other in density, the method comprising:
a first step of determining a first length of an edge of a portion that becomes a boundary between the first mesh and the second mesh;
a second step of adjusting size of a first group of polygons including the edge of the portion that becomes the boundary based on the first length determined in the first step;
a third step of determining a second length of an edge of a portion that neighbors to the first group of polygons based on the first length determined in the first step and the length of an edge of a second group of polygons that neighbor the first group of polygons;
a forth step of adjusting size of a second group of polygons based on the second length determined in the third step, each of the first and second groups of polygons being part of polygons structuring the first mesh and of polygons structuring the second mesh; and
a fifth step of merging the first mesh and the second mesh in each of which the polygons are adjusted.

* * * * *